(No Model.) 4 Sheets—Sheet 1.
D. H. LENTZ.
ROLLING MILL APPLIANCE.
No. 314,297. Patented Mar. 24, 1885.
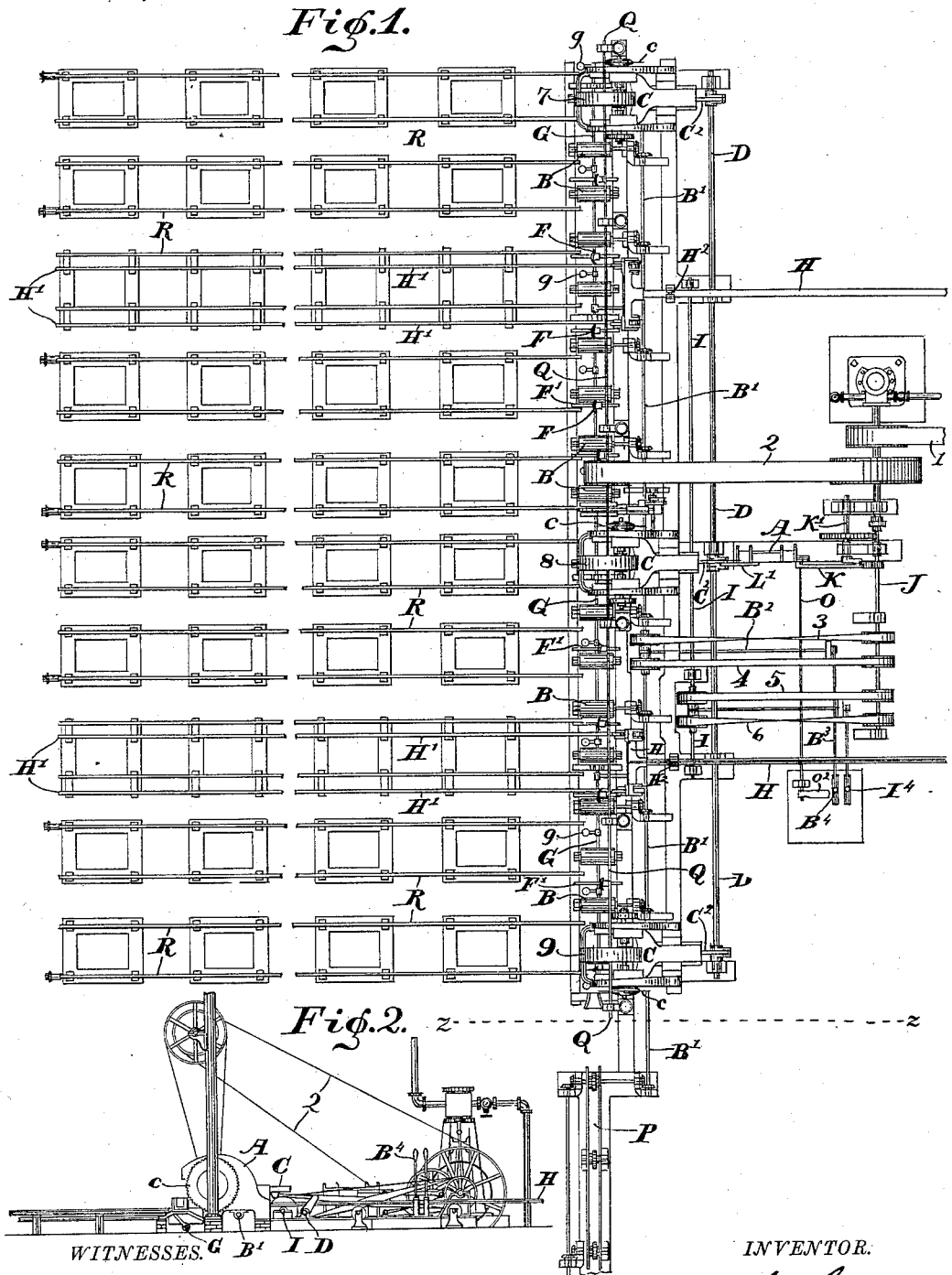
WITNESSES.
Chas. N. Leonard.
E. W. Bradford.
INVENTOR.
David H. Lentz,
PER
C. Bradford.
ATTORNEY.

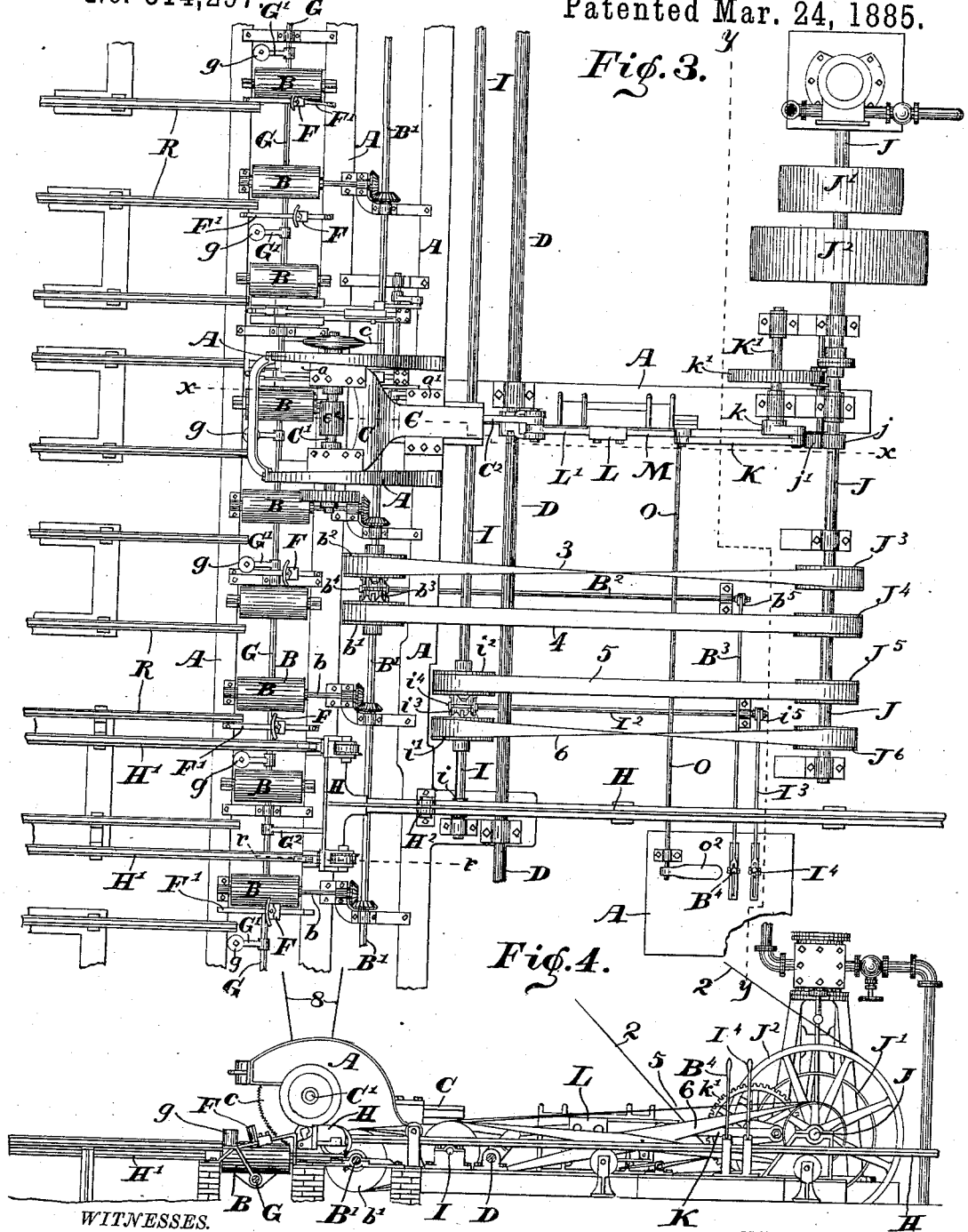

(No Model.) 4 Sheets—Sheet 3.
D. H. LENTZ.
ROLLING MILL APPLIANCE.
No. 314,297. Patented Mar. 24, 1885.
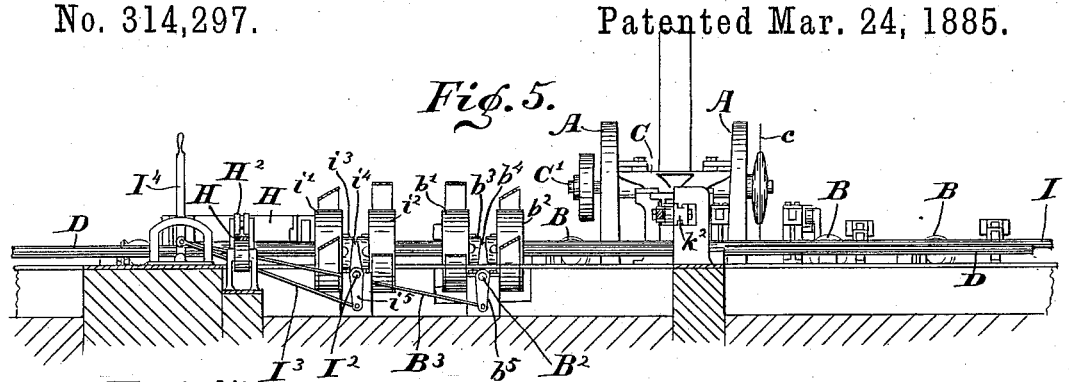
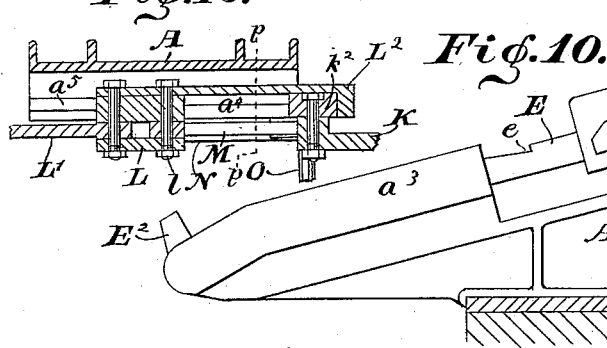
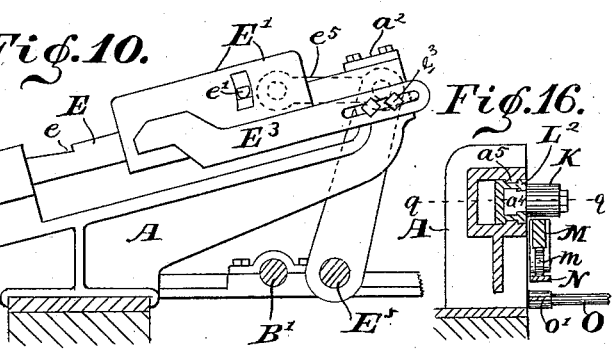
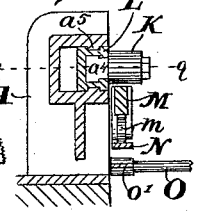
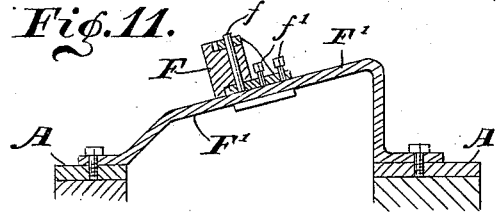
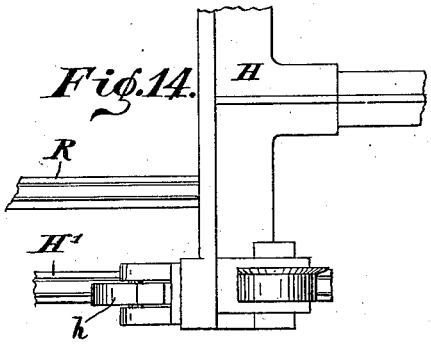
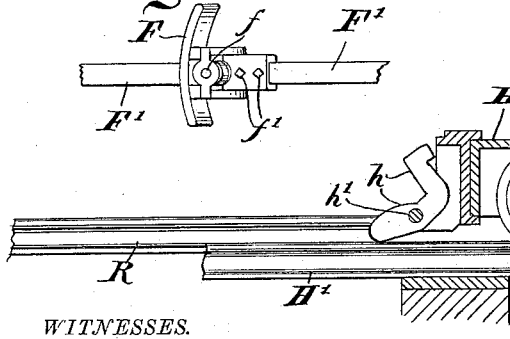
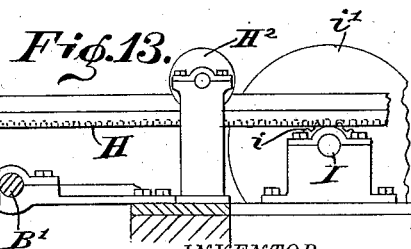
WITNESSES.
Chas. N. Leonard,
E. W. Bradford.
INVENTOR.
David H. Lentz,
PER
C. Bradford,
ATTORNEY.
N. PETERS, Photo-Lithographer, Washington, D.C.

(No Model.) 4 Sheets—Sheet 4.
D. H. LENTZ.
ROLLING MILL APPLIANCE.
No. 314,297. Patented Mar. 24, 1885.
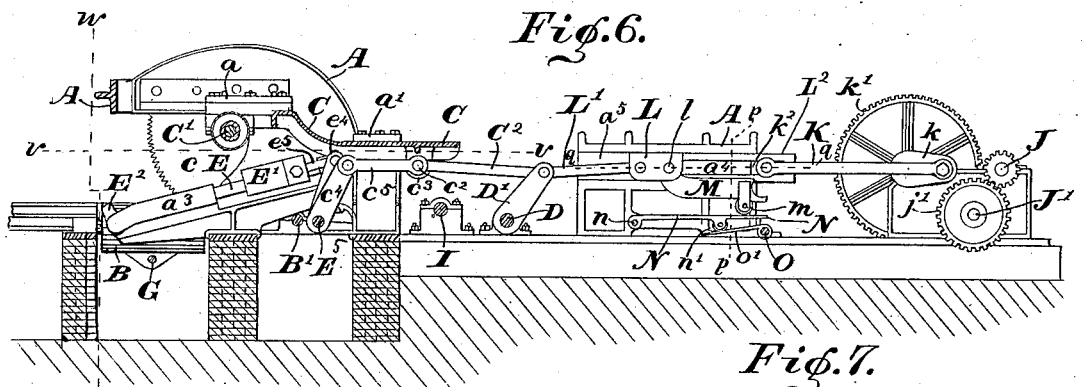
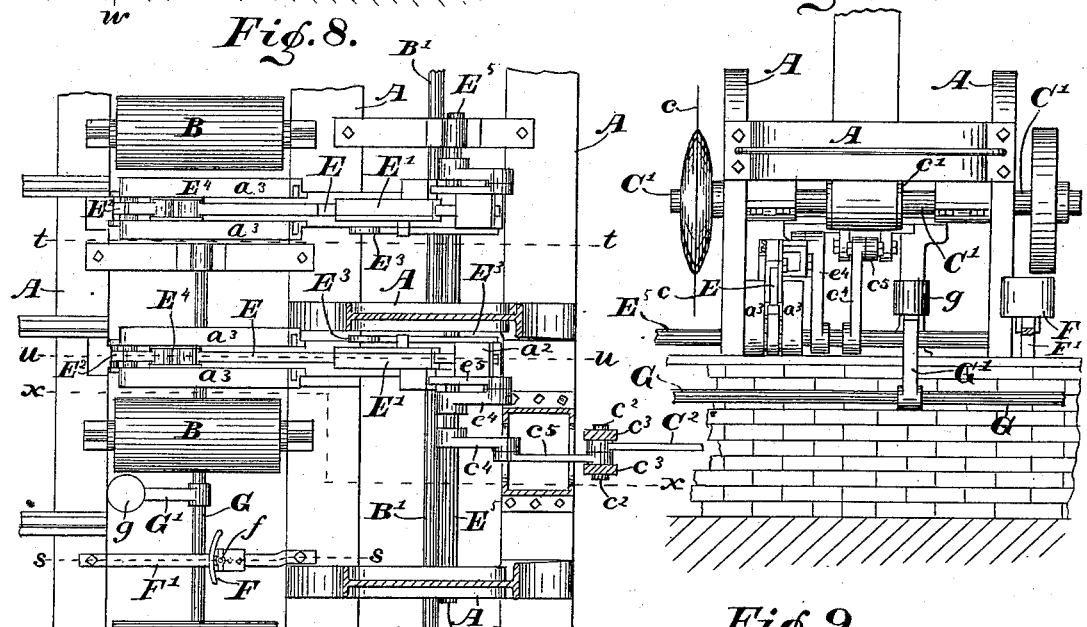
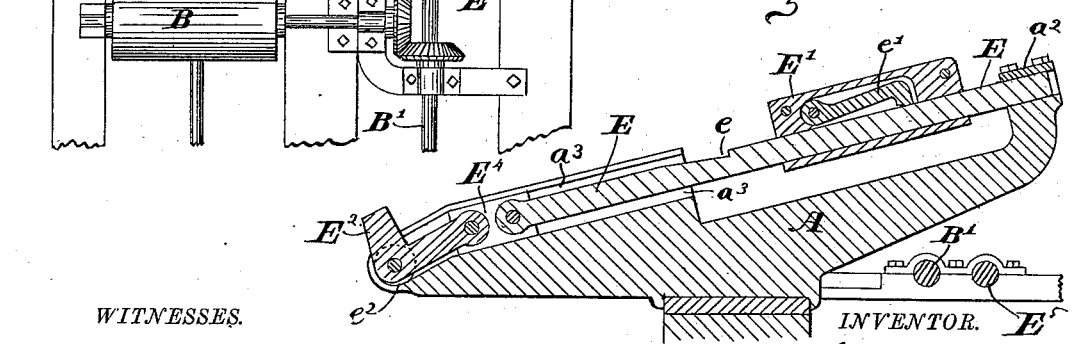
WITNESSES.
Chas. N. Leonard.
E. W. Bradford.
INVENTOR.
David H. Lentz,
PER
C. Bradford,
ATTORNEY.

UNITED STATES PATENT OFFICE.

DAVID H. LENTZ, OF INDIANAPOLIS, INDIANA, ASSIGNOR OF ONE-THIRD TO JOHN THOMAS, OF SAME PLACE.

ROLLING-MILL APPLIANCE.

SPECIFICATION forming part of Letters Patent No. 314,297, dated March 24, 1885.

Application filed March 3, 1884. (No model.)

*To all whom it may concern:*

Be it known that I, DAVID H. LENTZ, of the city of Indianapolis, county of Marion, and State of Indiana, have invented certain new and useful Improvements in Rolling-Mill Appliances, of which the following is a specification.

My said invention consists in improved mechanism for handling, sawing, and curving rails after they have been rolled. I have shown in my Letters Patent No. 307,473, dated November 4, 1884, the construction of mill which I prefer so far as handling the blooms and rolling them into rails are concerned; and this present invention includes the mechanism by which the remaining operations for completing the rails and delivering them onto the hot-bed are accomplished, the two cases showing complete means for transforming blooms into finished rails.

Referring to the accompanying drawings, which are made a part hereof, and on which similar letters of reference indicate similar parts, Figure 1 is a top or plan view of the appliances embodying my present invention; Fig. 2, a side elevation thereof as seen from the dotted line $z\ z$; Fig. 3, a view similar to a portion of Fig. 1 on an enlarged scale; Fig. 4, a side elevation of the same; Fig. 5, a view looking to the left from the dotted line $y\ y$ in Fig. 3; Fig. 6, a detail sectional view looking upwardly from the dotted line $x\ x$ in Fig. 3; Fig. 7, a front elevation of the saw and adjacent parts as seen from the dotted line $w\ w$ in Fig. 6; Fig. 8, a horizontal sectional view looking downwardly from the dotted line $v\ v$ in Fig. 6; Fig. 9, a detail section of the curving mechanism on the dotted line $u\ u$ in Fig. 8; Fig. 10, a view of the curving mechanism as seen from the dotted line $t\ t$ in Fig. 8, showing the tripping devices; Fig. 11, a section on the dotted line $s\ s$ in Fig. 8 through one of the stops which hold the rail while the curving mechanism is operating; Fig. 12, a detail top plan of a portion of the same; Fig. 13, a section on the dotted line $r\ r$ in Fig. 3 through the head of one of the traveling rail-carriers; Fig. 14, a detail top plan of a portion thereof; Fig. 15, a horizontal section looking downwardly from the dotted line $q\ q$ in Figs. 6 and 16, and Fig. 16 a transverse sectional view of the same parts looking to the right from the dotted line $p\ p$ in Figs. 6 and 15.

In said drawings the portions marked A represent the frame-work; B, the rollers on which the rails are carried in front of the saws; C, the sliding frame in which the saw-arbor is mounted; D, a rock-shaft for operating said frame; E, the rail-curving bars; F, adjustable stops forming part of the rail-curving mechanism; G, a rock-shaft carrying guide-rollers; H, traveling rail-carriers whereby the finished rails are delivered onto the hot-bed; I, a shaft for driving the same; J, the main or driving shaft; K, a pitman driven thereby through a series of gearing; L, a cross-head adapted to be driven by the pitman K; M, a latch by which the engagement is made between said cross-head and said pitman; N, a plate for raising and lowering said latch; O, a rock-shaft by which said plate is operated; P, the way over which the rails come from the rolls; Q, a line-shaft from which the saws are driven; R, the rails of the hot-bed; and the numerals 1 to 9, inclusive, the various belts employed in driving the various portions of the apparatus.

The frame A is preferably set on masonry footings, and contains bearings for the various portions of the mechanism, as will be understood from the drawings and the following description, particular description of parts being given where necessary in connection with the description of the portions of the mechanism related thereto.

The rollers B are the carrying-rolls by means of which the rails are handled while being sawed and curved. They are mounted in bearings in the frame A, and a portion of them have extended shafts $b$, and are driven thereby through a miter-gear connection with the shaft B'. Said shaft B' is provided with two loose pulleys, $b'\ b^2$, which are driven in reverse directions by belts from the main shaft, as shown, and have a clutch, $b^3$, interposed between them, by which either may be set in motion through appropriate mechanism, a rock-shaft, $B^2$, connecting-rod $B^3$, and lever $B^4$ being the means shown and preferred. The rock-shaft has two arms, one of which, $b^4$, terminates in a fork for operating the clutch, and the other of which, $b^5$, is attached to the connecting-rod.

Each of the sliding frames C is mounted in ways $a\ a'$ in the frame A, which rises up at this point high enough for this purpose, and also to form a guard for the saw. It carries the arbor C' on which the saw $c$ is mounted, and also a pulley, $c'$, for driving the same. At or near its rear end each frame is connected with the rock-shaft D through a connecting-rod, $C^2$, a pivot, $c^2$, mounted in lugs $c^3$ on said frame, being the means of union.

The rock-shaft D is provided with arms D', to which are attached the several connecting-rods $C^2$, and thus, when said shaft is rocked, all the frames C, and with them the saws, are moved in unison, and also through other sets of connecting-rods, $C^5$, and arms and rock-shafts, as will be presently described, the rail-curvers E. This rock-shaft is connected to the operating or driving mechanism.

The rail-curver is composed of the curving-bar E, supported at the upper end in a bearing, $a^2$, in the frame-work, and at the lower end by a cross-head, $E^4$, which rests in slides $a^3$.

To the lower end of the bar E is connected the hook $E^2$ by means of the cross-head $E^4$, (which serves as a connecting-link,) and said hook is preferably provided with anti-friction trucks $e^2$, which move in the same slides or ways $a^3$ with the cross-head $E^4$. The lower end of these slides or ways has a more abrupt incline than the remaining portion, thus permitting the hook to drop below the level of the rolls B, and thus out of the way of the rails when in the position shown, which is the position it occupies when at rest. When started into operation, the sharp incline quickly brings it above the rolls and into engagement with the rails.

Upon the upper portion of the bar E is the sliding block E', containing a pawl, $e'$, and upon the side of the frame A, near the bearing $a^2$, is secured the trip $E^3$. The sliding block is secured to the operating mechanism by the bar or link $e^5$.

The operation is as follows: The sliding block is operated through the link $e^5$ to move up and down on the bar E. In its downward movement, when it reaches the proper point the pawl $e'$ drops into and engages with the notch $e$ in said bar, and in its upward movement, by reason of said engagement, it draws said bar with it, thus, through the hook $E^2$, curving the rail. When it arrives at the proper point, the trip $E^3$ engages with a projection on the side of the pawl (see especially Fig. 10) and raises said pawl out of the notch $e$, thus releasing the bar and its hook, which then by their own gravity are returned to the position shown, while the block E' passes on to the end of the stroke, there to remain until again set in operation by the operating mechanism. The trip is secured in position by means of a slot therein and set-bolts $e^3$, and is thus adapted to be so adjusted as to release the engagement between the pawl $e'$ and notch $e$ at any point desired. The stops F being also adjustable, the apparatus can be arranged to curve the rail to any extent desired, as will be readily understood. The portions of the frame A in which are the bearings $a^2$ and slides $a^3$ are inclined to such an extent that the curving mechanism will operate to bend the rail directly from the head to the foot, notwithstanding the greater width of the foot, which throws the rails into such a position on the carrying-rolls that they would be curved diagonally by a horizontally-moving curving mechanism, as will be readily understood by those skilled in the art. The stops F are pivoted to bracket-bearings $F^2$ by pivots $f$, and said brackets are adjustably secured to bars F (see especially Figs. 11 and 12) by means of set-screws $f'$. The adjustment on the bar F' permits the mechanism to be arranged to bend the rails to any extent desired, and the pivot $f$ permits the segmental stop F, which is loosely mounted thereon, to automatically accommodate itself to the face of the rail as it comes in contact therewith without reference to its position. The rock-shaft G has several arms G' thereon, and these are provided with rollers $g$, by which the rails are guided as they pass along the carrying-rolls B. At the points where the rail-carriers H pass over this shaft are other arms $G^2$, which are so arranged that said rail-carriers will come in contact therewith as they return from their trip out onto the hot-bed and rock said shaft, thus bringing said guide-rollers up into operative position, where they remain until the rail has been brought into position, sawed, and curved, and is ready to be pushed out onto the hot-bed. As the rail-carriers start to do this, they release the arms $G^2$, permitting the shaft G to rock in the other direction, lowering the guide-rollers below the level of the carrying-rolls B, thus allowing the rails to be pushed off said carrying-rolls onto the hot-bed. The rail-carriers H are substantially small trucks or cars, which have long stems or bars extending out therefrom and forming part thereof. They are provided with wheels, and are mounted on track-rails H', which run out between the rails of the hot-bed, as shown. The stems which extend out from these trucks are provided with racks on their under sides, as indicated by the dotted lines in Fig. 13, and have guide-trucks $H^2$, under which they pass, and whereby they are guided and kept in position as they pass back and forth. Said rail-carriers are also provided with catches $h$, which are secured thereto by pivots $h'$. This pivot is so located that when a rail is mounted on said catches the weight will be nearly (but not quite) balanced thereon. The rail is thus nearly raised free from the rails of the hot-bed while being shoved over them, and is thus protected from abrasion, while it readily discharges itself from the rail-carrier when said carrier is started back, as will be readily understood. (See especially Fig. 13.) The shaft I is provided with pinions $i$, which engage with the racks on the stems of the rail-carriers, and thus drive said rail-carriers back and forth. Said shaft is provided with two loose pulleys, $i'$ $i^2$, which are driven in reverse directions by belts from the main shaft, as shown, and have a clutch, $i^3$, interposed between them, by which either may be set in motion. For this latter purpose a rock-shaft, $I^2$, connecting-rod $I^3$, and lever $I^4$ are provided. This rock-shaft, like the rock-shaft $B^2$, has two arms, one of which, $i^4$, terminates in a fork for operating the clutch, and the other of which, $i^5$, is attached to the connecting-rod. The lever $I^4$ is an ordinary hand-lever, whereby the mechanism is operated, and is preferably provided with the usual catches and segment for securing it in a desired position. The shaft J is an ordinary main shaft, and is driven by an engine or other suitable power. It has the belt-pulleys $J'$, $J^2$, $J^3$, $J^4$, $J^5$, and $J^6$, by which, through belts 1 2 3 4 5 6, various portions of the mechanism are driven, and also a gear-wheel, $j$, which, through the similar wheel, $j'$, the counter-shaft $J^7$ and the gear-wheels $j^8$ and $k'$, drives the crank-shaft $K'$, and thus, through the crank $k$, the pitman K. The pitman K is secured to the crank $k$ at one end, and is driven thereby. At the other end it is secured to a sliding block or head, $k^2$, which rests in a groove or way, $a^4$, in an extension, $L^2$, of the cross-head L. This pitman is caused to operate the cross-head, and thus the mechanism attached thereto, or allowed to run idle by simply raising and lowering the latch M, as will be presently described. The cross-head L moves in the way $a^5$ in the framework A. It is connected to the arm $D'$ on the rock-shaft D by the connecting-rod $L'$, as shown most plainly in Figs. 3 and 6, and to the pitman K by the extension $L^2$, as shown most plainly in Figs. 6 and 15. The catch M is connected to the cross-head L by a pivot $l$. It usually drops down so as not to come in contact with the pitman K or its head, but is adapted to be thrown up so as to engage with said pitman when it is desired to operate the mechanism connected to said cross-head. It rests on a plate, N, and is provided with a truck, $m$, which serves the usual purpose of an anti-friction truck as the plate N is operated to move it up and down. It will be seen by an examination of the drawings, especially Figs. 6 and 15, that when this latch is in raised position the operation is the same as if the cross-head L were solid, with the pitman K and connecting-rod $L'$ attached to fixed wrists thereon; but when the catch is in lowered position and the parts are in the position shown the pitman can move back and forth without affecting the position of the cross-head or the parts connected thereto. The plate N is secured at one end to the frame A by the pivot $n$, and has an anti-friction truck, $n'$, which rests on the arm $o'$ of the shaft O, whereby the other end is supported. The rock-shaft O is the means whereby the latch M may be thrown up into engagement with the pitman K. It is provided with the lifting-arm $o'$ and the treadle $o^2$, by which said object may be accomplished. The way P is simply the way over which the rails come from the rolls of the rolling-mill, and is the way shown in my former application before referred to. The line-shaft Q and the hot-bed rails R, as well as the several belts, are similar to corresponding parts in other like places, and need no special description.

The operation of my said invention may be briefly recapitulated as follows: The operator stands near the point where the levers $B^4$ and $I^4$ and the treadle $o^2$ are located. When a rail comes down the way P from the rolls, he, through the lever $B^4$, operates the mechanism to drive the carrier-rolls, and thus brings the rail to exactly the point desired, being able, by the means already described, to cause said carrier-rolls to move the rail in either direction. When the rail is in the position desired, the lever $B^4$ is brought to the position which stops the movement of the rails and the treadle $o^2$ brought into use, and the mechanism which drives the saws and rail-curvers thus put into operation. When the rails are sawed and curved, the operation of this mechanism is stopped, and, through the lever $I^4$, the mechanism which drives the rail-carriers H is put in operation, and the rail thereby carried out to the desired position on the hot-bed. By reversing the lever, the mechanism is operated to bring the rail-carriers back to position, and in so doing the arms $G^2$ on the rock-shaft G are forced down and the guide-rollers $g$ thus brought up in position, as before described.

Having thus fully described my said invention, what I claim as new, and desire to secure by Letters Patent, is—

1. The combination, in rolling-mill appliances for sawing and handling the rails, of the frame A, having a raised portion in which are slides, a sliding frame, C, mounted and moving in said slides, the saw-arbor and saw mounted on said frame, connecting-rods running to the driving mechanism, and a latch portion which may be moved to engage with or be disengaged from said driving mechanism, whereby said driving mechanism may while in continual operation operate said sliding frame intermittingly, substantially as set forth.

2. In rolling-mill appliances with the usual means of supporting the rails, the mechanism for curving said rails, consisting of adjustable stops arranged at intervals, and curvers E, near the saws, which consist of the sliding bar having a hook on the end, a slide thereon provided with the means of engagement therewith, a connecting-bar connecting said slide with driving mechanism, and said driving mechanism, substantially as set forth.

3. In a curving mechanism for curving railroad-rails, the combination of the stops set on inclines and curvers mounted in inclined slides, said inclines being arranged at such an angle to the face of the rolls whereon the rail is mounted that said rail is curved directly from the head to the foot notwithstanding the difference in the width of said head and foot, substantially as set forth.

4. In a rail-curving mechanism, the combination of a stop and a traveling curving-bar, E, the latter moving in slides, and provided with a hooked end, $E^2$, and a notch, $e$, with which a pawl, $e'$, on the operating-head E' may engage, substantially as set forth.

5. The combination of the traveling curving-bar, E, having notch $e$ therein, the operating-head E', having pawl $e'$, and the trip $E^3$ by which said pawl is disengaged from said notch as the device reaches the proper point, substantially as described, and for the purposes specified.

6. In rolling-mill appliances, the combination of the inclined bar F', the adjustable stop F thereon, and a hooked curving-bar for drawing the hot rails against said stop, substantially as set forth.

7. In rolling-mill appliances, the combination, with the carrying-rolls for the rails, of a rock-shaft, G, having arms G' whereon are mounted guide-rollers $g$, substantially as described, and for the purposes specified.

8. The combination, in rolling-mill appliances, with the carrying-rolls for the rails, of the rock-shaft G, carrying guide-rolls $g$, and an arm, $G^2$, said arm $G^2$ acting as a lever whereby the shaft is rocked, and the car of the rail-carrier H, which comes in contact with said arm and operates said rock-shaft, substantially as described, and for the purposes specified.

9. The combination, in rolling-mill appliances, of the rail supporting and sawing mechanism, a hot-bed, carrying tracks extending out alongside and continuously with the rails of said hot-bed, and rail-carriers H, mounted and adapted to run back and forth on said tracks from one side to the other of said hot-bed, the stems of said rail-carriers being of substantially equal length with the rails of the hot-bed, and having rack-bars thereon, and the shaft I, having pinions $i$, which engage with said rack-bars and drive said rail-carriers, substantially as shown and described, and for the purposes specified.

10. The combination of the hot-bed, rail-carrier tracks arranged between and substantially the same length as the hot-bed rails, the rail-carriers H, the shaft I for driving the same, having loose pulleys and a clutch thereon, and the rods and levers for operating said clutch, whereby it may be engaged with either of said pulleys, and thus drive said shaft in either direction, substantially as set forth.

11. The combination, in rolling-mill appliances, of the rail supporting and sawing mechanism, the hot-bed, the carrier-track extending out between the rails of the hot-bed across said hot-bed, a rail-carrier mounted on said track, said rail-carrier stems having rack-bars thereon, a shaft having pinions which engage with said rack-bars, and guide-trucks $H^2$, mounted in bearings above said stems, whereby said stems are held down and the rack-bars thereon held into engagement with said pinions, substantially as set forth.

12. In rolling-mill appliances, a rail-carrier, H, having a pivoted catch, $h$, arranged to carry a part of the weight of the rail as the latter is being pushed out on the hot-bed, substantially as set forth.

13. The combination, in rolling-mill appliances, of the operative mechanism, the driving mechanism, the connecting mechanism, said connecting mechanism being composed in part of the latch M and a means for throwing said latch into and out of engagement with the pitman, consisting of a pivoted table whereon said latch rests, and a rock-shaft provided with an arm whereby when the shaft is rocked the table, and with it the catch, will be lifted, substantially as set forth.

14. The combination, in rolling-mill appliances, of the sawing mechanism, the driving mechanism, and the connecting mechanism, said connecting mechanism being composed of a pitman, a connecting-rod, a cross-head, L, having an extension, $L^2$, containing a groove in which the wrist-block of the pitman travels, and a latch, M, substantially as described, and for the purposes specified.

15. The combination, with the sliding saw-frame C and the curver E, of the connecting links and rods whereby said frame and curver are moved simultaneously and by the same operation, substantially as set forth.

16. The combination, in rolling-mill appliances, of the frame C, the rail-curver E, the rock-shaft $E^5$, the arms $c^4 e^4$, and the links $c^5 e^5$, substantially as described, and for the purposes specified.

In witness whereof I have hereunto set my hand and seal, at Indianapolis, Indiana, this 25th day of February, A. D. 1884.

DAVID H. LENTZ. [L. S.]

In presence of—
 C. BRADFORD,
 CHAS. L. THURBER.